United States Patent [19]

Wise et al.

[11] Patent Number: 4,599,211
[45] Date of Patent: Jul. 8, 1986

[54] THERMAL TREATMENT OF CONCRETES CONTAINING STAINLESS STEEL

[75] Inventors: Sean Wise, Millersville; Mark L. MacKenzie, Laurel, both of Md.

[73] Assignee: Research One Limited Partnership, Towson, Md.

[21] Appl. No.: 673,843

[22] Filed: Nov. 21, 1984

[51] Int. Cl.$^4$ ............................................... C04B 40/00
[52] U.S. Cl. ........................................ 264/82; 106/97; 264/333; 264/DIG. 43
[58] Field of Search ................... 264/82, DIG. 43, 333

[56] References Cited

U.S. PATENT DOCUMENTS

| 1,711,027 | 3/1927 | Luzzutti | 264/DIG. 43 |
| 2,496,895 | 2/1950 | Staley | 264/82 |
| 3,972,969 | 8/1976 | Rio et al. | 264/82 |
| 4,482,385 | 11/1984 | Satkowski et al. | 106/98 |

Primary Examiner—James Derrington
Attorney, Agent, or Firm—Lawrence I. Field

[57] ABSTRACT

The strength of the stainless steel containing cementitious composite material of U.S. Pat. No. 4,482,385 is improved by curing it according to a specific schedule which includes the steps of curing in a mold, steam curing after demolding, slow drying and dry thermal curing.

2 Claims, 1 Drawing Figure

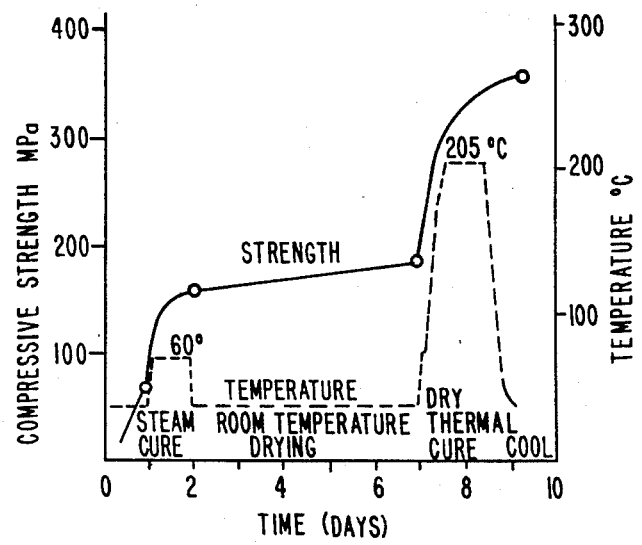

THERMAL TREATMENT OF CONCRETES CONTAINING STAINLESS STEEL

This invention relates to a high strength cementitious tooling/molding material such as is described in U.S. Pat. No. 4,482,385 issued Nov. 13, 1984. More particularly, it relates to an improvement in said material which is obtained by curing said material in a specific manner.

Briefly it has been found that the strength of the material prepared in accordance with said patent may be enhanced by curing the treatment according to the following schedule:

(a) cure in the mold
(b) steam cure after demolding
(c) slow drying
(d) dry thermal cure.

The first step in the curing procedure is a cure in the mold after the material has been cast. This is effected at ambient room conditions—e.g., temperatures in the vicinity of 20° C. and at normal room humidity—e.g., at up to 25% relative humidity. This step takes between 20 and 48 hours.

Thereafter the cast material is removed from the mold and given a steam cure at 60° C. for at least 18 hours—e.g., for 20-30 hours. This produces about a 100% increase in the compressive strength of the material.

The third step in the procedure is a slow drying for at least one day and, preferably 5 days, at room temperature and humidity. This produces a further increase in compressive strength.

The final step in the procedure is a dry thermal cure at an elevated temperature between 175° and 230° C. for between 20 and 48 hours, e.g., at 205° C. for 1-2 days which results in another marked increase in compressive strength and a material which exhibits vacuum integrity.

FIG. 1 is a plot of the compressive strength as the cure progresses for a composition of the type described as preferred in Table 1 of U.S. Pat. No. 4,482,385 wherein the principal filler consists of a mixture of stainless steel particles which are irregular in shape, said composition comprising:

|  | Weight % | Volume % |
| --- | --- | --- |
| Stainless Steel 10/25 | 34.8 | 16.1 |
| Stainless Steel 80/100 | 18.7 | 8.6 |
| Portland Cement (Class H) | 24.3 | 28.4 |
| Min-U-Sil (Fine quartz) | 11.8 | 16.2 |
| Silica Fume | 3.3 | 5.5 |
| Water | 6.2 | 22.4 |
| Mighty 150 (Superplasticizer) | 0.9 | 2.8 |
| Tri-n-butyl phosphate (defoamer) | 0.02 | 0.09 |

The composition is mixed by adding the liquid components to the blended solid components, and stirred in a planetary mixer for periods up to ten minutes. The tools are made by casting the mix over patterns made of wood, metal, gypsum or plastic. The patterns are prepared by applying a sealer to prevent any unwanted interaction between the cement and pattern material. They are then sanded and polished to give a smooth surface finish. Casting is done using 160 Hz vibration to help fluidize the cement mix and care is taken to ensure a smooth even flow of cement over the pattern surface to eliminate air bubble entrapment, particularly at the pattern surface. Both casting and curing on the pattern are carried out at ambient temperature. After 24 hours, the cast tool is removed from the pattern and subjected to the curing schedule described above.

Having now described the invention it is not intended that it be limited except as may be required by the appended claims.

We claim:

1. A method of increasing the strength of a cementitious composite material containing irregularly shaped stainless steel particles comprising:
   a. casting the composite material into a mold;
   b. permitting the cast material to remain in the mold for between 20 and 48 hours at ambient room conditions;
   c. demolding the cast material and steam curing the demolded material at 60° C. for at least 18 hours;
   d. slow drying the steam cured material for at least one day at ambient room conditions and then
   e. dry thermally curing the resulting material at an elevated temperature between 175° and 230° C. for between 20 and 48 hours.

2. The method of claim 1 in which the temperature is about 205° C. and the dry thermal cure is for about 1.5 days.

* * * * *